H. WILKE.
PROCESS OF PROVIDING BREAD AND OTHER BAKED ARTICLES WITH A PROTECTIVE COVERING.
APPLICATION FILED NOV. 17, 1909.
1,010,103.
Patented Nov. 28, 1911.
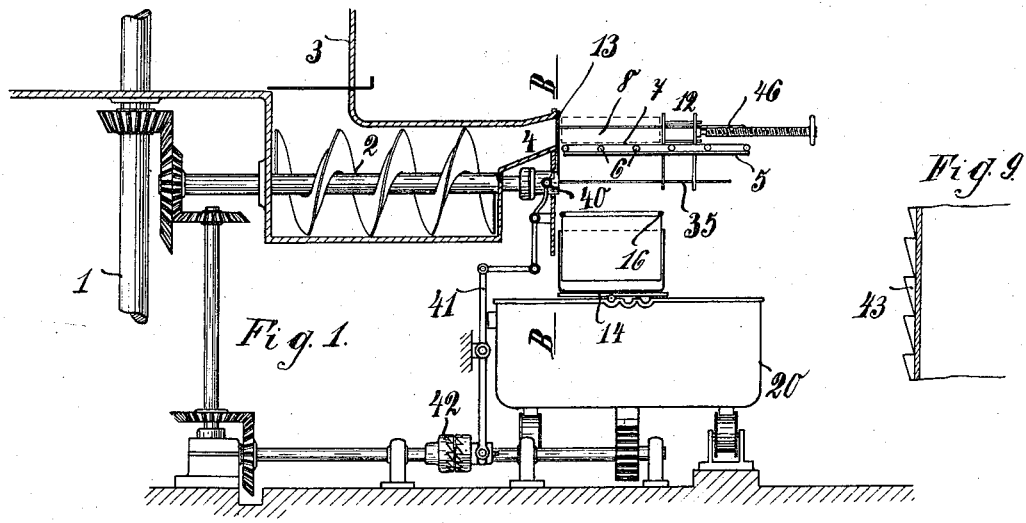
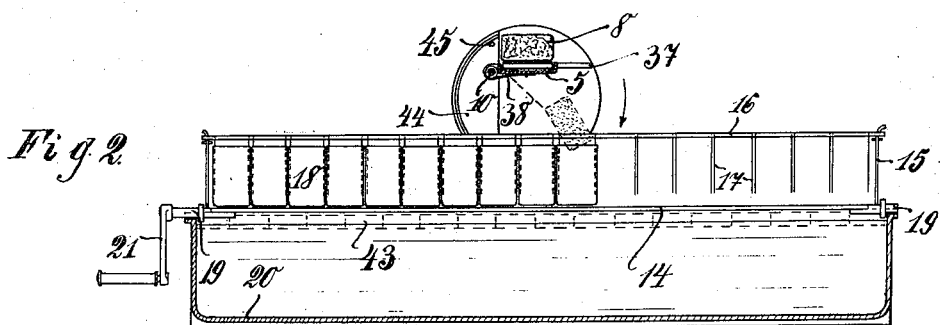
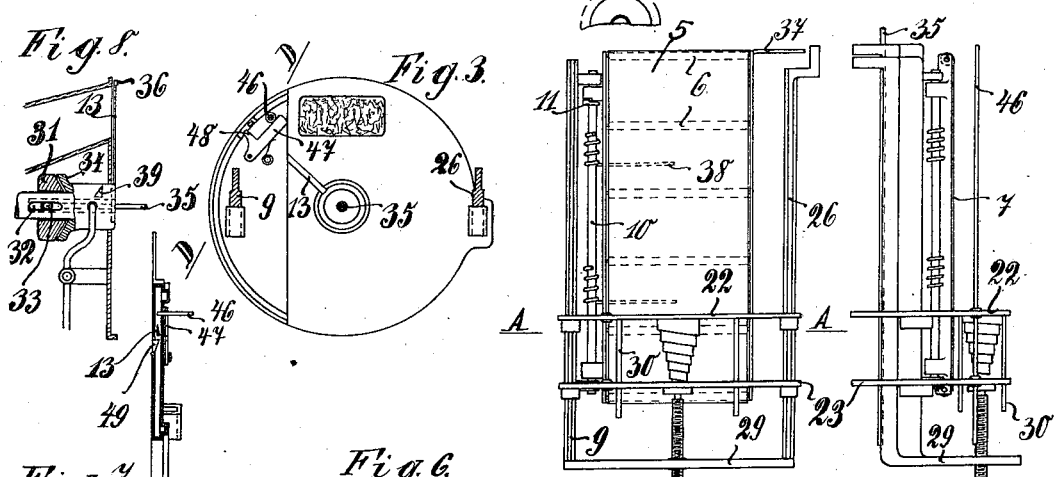
Witnesses:
E. Schallinger
R. Goodstein
Inventor
Hermann Wilke
by B. Singer

UNITED STATES PATENT OFFICE.

HERMANN WILKE, OF CASSEL, GERMANY.

PROCESS OF PROVIDING BREAD AND OTHER BAKED ARTICLES WITH A PROTECTIVE COVERING.

1,010,103.   Specification of Letters Patent.   Patented Nov. 28, 1911.

Application filed November 17, 1909. Serial No. 528,531.

*To all whom it may concern:*

Be it known that I, HERMANN WILKE, a subject of the German Emperor, residing at Elfbuchenstrasse 12, Cassel, Germany, have invented a new and useful Process of Providing Bread and other Baked Articles with a Protective Covering, of which the following is a specification.

This invention relates to a process of providing bread and other baked articles with a protective covering.

According to this invention the dough is inserted in a covering adapted to be closed on all sides and is baked together with the covering. A stiff greased vegetable fiber paper is used as the covering, which paper is intended as a substitute for the smooth dough shell or covering worked by hand, and before using the bread can be readily removed therefrom.

In the performance of the process, the dough on removal from the kneading machine is separated into pieces and each piece of dough is inserted in an oil-sheet covering, the desired form being simultaneously given to the dough. The bread rises and is baked in this covering and is kept therein. The covering thus protects the bread from impurities during its production and storage, especially from contact with the hand.

A machine for performing the process is shown diagrammatically by way of example in the accompanying drawings in which—

Figure 1 is an end view partly in section through the dough feeding devices while Fig. 2 is a front elevation. Fig. 3 is a section on an enlarged scale on the line B—B of Fig. 1. Figs. 4 and 5 show the table on an enlarged scale in plan and in end view respectively. Fig. 6 is a section on the line A—A of Fig. 4. Fig. 7 is a section on the line D—D of Fig. 6. Figs. 8 and 9 show details on an enlarged scale.

The dough is fed by the feeding worm 2 driven by the main shaft 1, from the kneading trough 3 to the outlet 4, in front of which an endless band 7 running over rollers 6 in a table 5 takes up the dough as it leaves the trough. The table 5 is rotatable from its horizontal position in the direction of the arrow 2 about the axis 10 on the rail 9, the movement being limited by a stop 11. A device 12 movable and adjustable above the table serves for measuring off the lengths of the several pieces of dough which can then be separated from one another by a blade 13 and on the tipping of the table the pieces of dough will fall into the compartments of a dough carrier. This dough carrier consists of a baseplate 14 with pins 15 on which is suspended a frame consisting of elastic cords 16. To the cords are secured parallel double metal sheets 17 spaced at equal distances behind one another, which on contraction or extension of the cords move toward or away from one another. The dough coverings 18 are pushed along the sheets in such manner that they rest on the base plate and form an inclosure; when all the inclosures are filled the cord frame is released and all the sheets are drawn away from the coverings, in which the pieces of dough remain. The dough carrier is mounted with pins 19 above the holder 20 filled with oil in which it can be dipped by means of a hand crank 21 in order both to lubricate the coverings and the strips.

The device 12 for measuring off the lengths of dough consists of two plates 22 and 23 which are guided on rails 26. These rails are either firmly secured or can be loosely suspended by pins 27, 28 beneath the mouth of the dough outlet 4 at the front end thereof. The curved bridge 29 connecting the rails at their outer ends carries a screw-threaded spindle 23$^a$ by means of which the plate 23 is moved and adjusted. The movement of the plate 22 corresponds with that of the plate 23, the plate 22 being resiliently connected with the frame and being also carried by pins 30. The machine operates automatically in such manner that after determination of the length of dough, the roll of dough controls the device 12 which engages the clutch for effecting the rotation of the blade which cuts the dough and causes it to be titled into the receiver of the dough carrier, whereupon on its further rotation the movement for feeding the dough carrier commences. Forward motion of the dough carrier is then interrupted momentarily, the next receiver being brought into position to receive the piece of dough next to fall.

According to the detailed drawing, Fig. 8, a friction cone 31 is arranged at the end of the feeding shaft which may be moved by the transverse pin 33 lying in the slot 32 in the shaft against the casing 34 loosely mounted on the end of the shaft and can be coupled therewith. The sliding movement of the friction cone actuates a rod or the like 35 lying in the axial direction of the shaft and guided through a central orifice till it reaches the pin 33 to which it is connected, the other end of which rod is adjustably connected with the curved part of the handle projecting beneath the rails 9, 26. The casing 34 carries the blade 13 which is carried with it by the shaft 2; as soon as the roll of dough moves back the spring-controlled plate 22 and through the intermediary of the rod 35 couples the friction cone 31 with the casing 34, the blade is rotated. The nose 36 on the blade 13 engages on rotation with the tongue 37 of the table which is thereby tilted downward until the nose in consequence of the eccentricity of the two rotary paths slides away from the tongue, and the table under the action of the springs 38 return into its horizontal position. On further rotation of the blade a wedge 39 arranged on the casing 34 strikes the roller 40 of a lever system 41, which thereby operates a clutch 42 for feeding the oil holder or dough carrier. As soon as the dough carrier is moved forward the width of a receiver, a tooth of a rack 43 provided on the oil holder breaks the connection. In order that the blade may only cut through the roll of dough when the latter has issued the required length and that on the other hand it may not drop back into the position of rest, two members are used which automatically bring the beginning and end of the cycle into agreement with the *modus operandi* of the machine.

According to Fig. 6 the left side of the front wall of the feeder is partly covered. In the cover 44 is provided an opening 45 in which enters the end of a rod 46 adapted to be adjusted on and fixed to the plate 22, and prevents rotation of the blade until it is raised from the plate 22. At this moment the bolt 47 operated by a spring closes the opening 45 and retains the rod until the blade 13 on its return with the nose 36 abuts on the knob 48 of the lock and moves this aside whereby the opening is freed. The rod is pushed by the plate into the opening 45, while simultaneously the rod 35 moves along the feeding shaft and disengages the connection between the friction cone 31 and the blade casing 34. The knife remains in this position, as its return movement is prevented by a resilient stop 49 which is forced aside by the rotating blade 60 and after passage of the blade returns to the locking position.

I claim:

1. The process of manufacturing bread and other baked articles, which consists in completely inclosing the dough in a paper covering, and baking the dough within the closed paper covering, substantially as described.

2. The process of manufacturing bread and other baked articles, which consists in completely inclosing the dough in a paper covering, baking the dough within the closed paper covering, and maintaining the baked bread within said closed paper covering until used, substantially as described.

3. The process of manufacturing bread and other baked articles, which consists in cutting the dough into sections of suitable length, completely inclosing each section on all of its sides in a paper covering, and baking the dough within the said paper covering, substantially as described.

4. The process of manufacturing bread and other baked articles, which consists in completely inclosing the dough within a covering consisting of oiled paper, and baking the dough within such covering, substantially as described.

5. The process of manufacturing bread and other baked articles, which consists in cutting the dough into sections of suitable length, completely inclosing each section of dough on all of its sides in a covering consisting of oiled vegetable fiber paper, and baking the dough within such closed covering, substantially as described.

6. The process of manufacturing bread and other baked articles, which consists in cutting the dough into sections of suitable length, completely inclosing each section of dough on all of its sides in a covering consisting of oiled vegetable fiber paper, baking the dough within the said covering of oiled vegetable fiber paper, and maintaining the baked bread in such covering until used, substantially as described.

In testimony whereof I affix my signature in presence of witnesses.

HERMANN WILKE.

Witnesses:
    ALBERT GÖLLNER,
    EVA REDEMANN,
    FRANZ KOHLHASE.